March 20, 1956
R. C. WEIDE
ELECTRICAL SWITCH MECHANISM
Filed Aug. 18, 1952
2,739,192
2 Sheets-Sheet 1
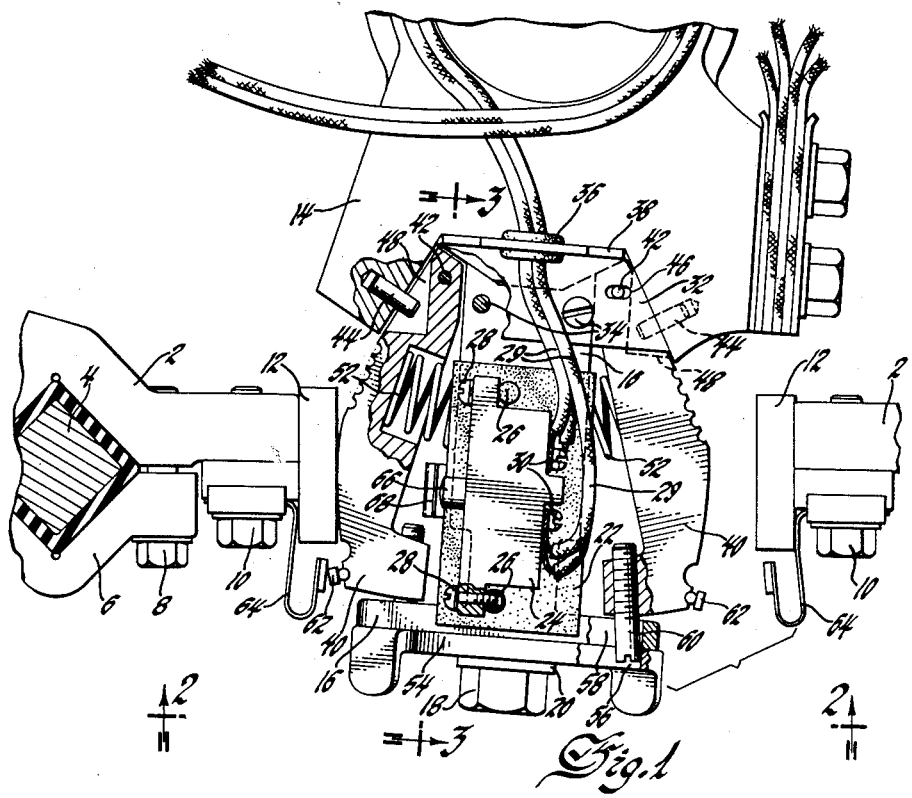
Inventor
Rudolph C. Weide
By Willits, Helwig & Baillio
Attorneys March 20, 1956  R. C. WEIDE  2,739,192
ELECTRICAL SWITCH MECHANISM
Filed Aug. 18, 1952  2 Sheets-Sheet 2

Inventor
Rudolph C. Weide
By Willits, Helwig & Baillio
Attorneys

United States Patent Office 2,739,192
Patented Mar. 20, 1956

2,739,192

ELECTRICAL SWITCH MECHANISM

Rudolph C. Weide, La Grange, Ill., assignor to General Motors Corporation, Detroit, Mich., a corporation of Delaware Application August 18, 1952, Serial 305,017

8 Claims. (Cl. 200—5)

This invention relates generally to electrical switch mechanisms and more particularly to electrical switch mechanisms used in conjunction with the cam switches on electrically powered vehicles equipped with dynamic braking. The invention will be described in connection with the cam switches used on diesel electric locomotives. It should be understood, however, as the description proceeds that the invention is not limited to electro-motive power only but has a much wider field of application.

In the diesel electric field it is well known that a main generator is driven by a diesel engine to supply electrical current to a plurality of traction motors geared to axles that turn the driving wheels of a locomotive. It is also well known that dynamic braking may be accomplished on these locomotives by means of a cam switch which when thrown simultaneously connects the traction motor across dynamic braking resistor grids.

The cam switch generally constitutes a pneumatically operated rotary multiple pole switch provided with terminals with which the main generator, the fields of the traction motors and the armatures of the traction motors are directly or indirectly connected. Also forming a part of the cam switch are sets of stationary contacts for each traction motor which may be connected in power or in braking by means of the movable contacts on the rotating portion.

In multiple pole switches such as the cam switch described above, there often arrive occasions when it is desirable to prevent the completion of only one of the several circuits normally closed by such a switch. For example, if a traction motor on a locomotive should become defective and no longer be capable of supplying motive power, it would become most urgent to isolate such a motor from the power circuit connecting the main generator and the traction motors together or its dynamic braking circuit to prevent the possibility of short circuiting and to relieve the resulting drag on the other traction motors. When a traction motor is isolated, however, the main generator when connected in power may become overloaded and therefore it becomes necessary to provide switching means used in combination with an additional circuit to correct or prevent such overloading.

It therefore becomes an object of this invention to provide a switching mechanism to be used in combination with a multiple pole switch and the circuits normally closed by the multiple pole switch which will prevent the completion of one of said circuits when said multiple pole switch is closed.

It is a further object of this invention to provide a switching means to be used in combination with a multiple pole switch and the circuits normally closed by the multiple pole switch, which will prevent the completion of one of said circuits and at the same time operate an additional circuit adapted to compensate for certain changes which must take place when said normally closed circuit is not completed.

It is a further object of this invention to provide on an electrically powered locomotive the novel combination of a cam switch used to place the traction motors of the locomotive across dynamic braking grids and a manually accessible motor cut-out switch on each pole compartment of the cam switch which when operated serves to isolate a traction motor from the power circuit or dynamic braking circuit of the locomotive.

It is a further object of this invention to provide mechanism for setting up a special low voltage control system which takes care of the necessary changes in the heavy current power or braking circuits after one or more traction motors have been disconnected.

It is a further object of this invention to provide a motor cut-out switch for the cam switch of a locomotive which is simple and inexpensive to manufacture and will readily adapt itself to equipment currently in use.

In the drawings:

Figure 1 is a top view of one set of stationary contacts of a cam switch showing the new movable contacts attached to one rotary portion of the switch with the means for retracting the movable contacts.

Figure 2 is a front view taken on the line 2—2 of Figure 1, and illustrates the cam means for retracting the movable contacts.

Figure 3 is a side view taken along line 3—3 of Figure 1, to show the actuation means for the low voltage control switch.

Figure 4:
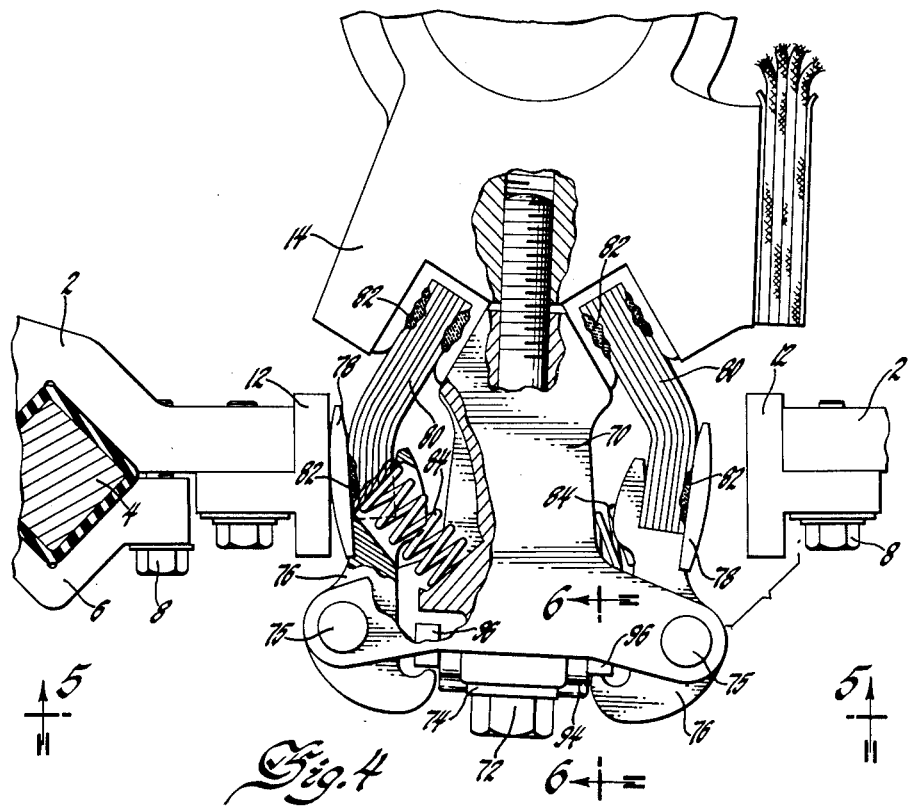
Figure 4 is a modification of the switch shown in Figure 1.

Referring now to Figures 1, 2 and 3 one pair of oppositely disposed stationary contact carriers 2 for the cam switch of a locomotive are shown. These carriers 2 are fastened to vertical insulated members 4 by means of brackets 6 and bolts 8. Secured to the contact carriers 2 by bolts 10 are a pair of contact tips 12. Interposed between the contact tips 12 and fastened to a rotatable portion 14 of the cam switch by a bolt 18 and a washer 20 is a contact carrier 16.

Attached to the top of the contact carrier 16 and insulated therefrom by means of a teflon pad 22 is a low voltage control switch 24 of conventional design. The low voltage control switch 24 is secured by means of insulated studs 26 and screws 28. Conductors 29 are shown connected to the low voltage switch 24 by the screws 30. These conductors 29 connect switch 24 with various well-known low voltage circuits which it is adapted to control. Also shown fastened to the contact carrier 16 by means of screws 34 is a bracket 32. The bracket 32 has a grommet 36 provided in a bent portion 38 which supports the conductors 29.

A pair of contact members oppositely disposed with respect to the contact carrier 16 are pivotally attached to the rotatable member 14 and the bracket 32 by means of pins 42, 44 and slots 46, 48 respectively. The bracket 32 and a second bracket 50 also serve as retaining means for the pivoted ends of the contact means 40. Interposed between the contact members 40 and the contact carrier 16 are a pair of helical springs 52 seated in recesses in the members 40 and the carrier 16. A manually operated cam member 54 having a pair of curved slots 56 is rotatably fastened to the carrier 16 by the same bolt 18 and washer 20 that attach carrier 16 to member 14. Adapted to ride in the slots 56 and also in a pair of guide slots 58 provided in one end of the carrier 16 are two pins 60. The pins 60 are securely fastened to the contact members 40 by means of threads on the pins and threaded holes in the contact members 40.

Attached to one side of the carrier 16 by means of screws 65 and adapted to actuate a button 66 of the low voltage switch 24 is a spring actuating lever 68. Also provided on each of the contact means 40 are unique arc protective contacts 62 adapted to engage mating arc protective contacts 64 fastened to the stationary contacts 12.

The operation of the cam switch including the retracting means for the movable contacts 40 is as follows:

The rotatable member 14 is shifted back and forth by a suitable driving mechanism for the entire cam switch. When this driving mechanism moves the rotatable member 14, the contact carrier 16 and the contact means 40 into the position shown in Figures 1, 2 and 3, the spring 52 urges the contact member 40 tightly against the stationary contact 12 and also against the rotating portion 14. Before the stationary contact 12 and the movable contact means 40 engage each other, however, the arc protective means 64 and 62 make contact to prevent any arcing and subsequent burning of the contact 12 and contact members 40. A certain amount of give is provided for contact members 40 because of the slots 46 and 58 which allow the pins 60 to slide back against the action of the springs 52. In other words, the firmness of the contact which is made between contacts 12 and 40 and the rotatable member 14 is almost wholly determined by the characteristics of the helical spring 52.

If, now, for some reason it should be desirable to prevent the completion of a circuit through the rotatable member 14, the movable contact members 40 and one of the stationary contacts 12 when the rotatable member is in the position shown, the cam means 54 may be actuated or rotated in a clockwise direction. This rotation of the cam means 54 causes the pins 60 to be directed inward toward the contact carrier 16 and along the slots 58 by means of the slots 56. Such movement of the pins 60 causes the contact members 40 also to be directed toward the contact carrier 16 and moves them out of engagement with the stationary contacts 12. When the contact member 40 shown to the left of the carrier 16 is moved toward the contact carrier 16 and away from the stationary contact 12, its inner portion engages the spring lever 68 which in turn presses against a button 66 on the low voltage control switch 24 to change the connections of the conductors 29 fastened to the low voltage control switch 24.

Figures 5, 6:
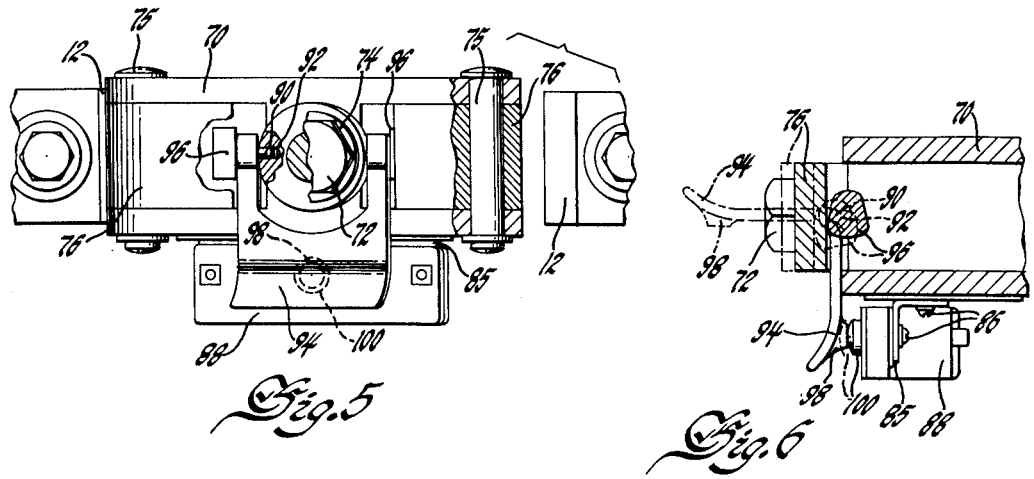
Figure 5 is a front view of the modification taken along the line 5—5 and serves to more clearly illustrate the modified cam means.
Figure 6 is a fragmentary side view taken along the line 6—6 of Figure 4 and shows the camming mechanism in an intermediate position.

Referring now to Figures 4, 5 and 6 a modification of the switch shown in the first three figures will be described. The same stationary contacts 12 are shown oppositely disposed and mounted in a similar manner to those in Figure 1. The means, however, attached to one of the rotatable portions 14 of the cam switch differ in certain respects. In Figures 4, 5 and 6 a contact carrier member 70 is shown attached to the rotatable portion 14 by means of a bolt 72 and a washer 74. Pivotally attached to the carrier 70 by means of pins 75 are two contact members 76 each having a contact tip 78 suitably fastened thereto. Joining each contact member 76 and contact tips 78 with the rotatable portion 14 is a woven, laminated, flexible conductor 80. These conductors 80 are secured by soldering 82 or other suitable means. Interposed between each contact member 76 and contact carrier 70 and residing in recesses therein is a spring 84.

Attached to the carrier 70 by means of a bracket 85 and screws 86 is a low voltage switch 88 which is similar to the one shown in the first embodiment of the invention. Also attached to the carrier 70 by means of pins 90 residing in holes 92 is an actuating lever 94 having oppositely disposed cams 96 rigidly attached thereto. An abutment 98 is provided on one portion of the actuating lever 94 which normally engages the button 100 of the low voltage switch 88.

The operation of the modification shown in Figures 4, 5 and 6 is similar to that shown in Figures 1, 2 and 3 and is as follows:

With the actuating lever 94 in a downward position the cams 96 do not engage the ends of the contact members 76 and the contact tips 78 are held outward in position to normally engage the stationary contacts 12 when the member 14 and the carrier 70 is rotated back and forth. However, when it is desired to disconnect any circuit attached to the stationary contacts 12 and the rotatable portion 14 and still allow the rotatable portion 14 to move backward and forward between the stationary contacts 12, the actuating lever 94 is lifted or rotated upwardly to a position 180° removed from its normal down position. When the lever 94 is so actuated the cams 96 which are rigidly attached thereto engage the ends of the contact members 76 and push them outward or away from the contact carrier 70. Such movement of the ends of the contact members 76 causes the members 76 to pivot about the pins 75 and the tips 78 to move inwardly and toward the contact carrier 70 and away from the stationary contacts 12. Also when the actuating lever 94 is moved to this up position the button 100 of the low voltage control switch 88 is released causing a change in the relative connection of circuits attached to the switch 88. This will compensate for any changes in the heavy current circuits when the contact tips 78 can no longer make contact in the different rotating positions of the rotative member 14.

It will now be appreciated that unique switch mechanisms have been described which may be used to simultaneously accomplish dual electrical functions. They are adapted to prevent completion of one of the main circuits controlled by a multiple pole double throw switch without interrupting the other main circuits controlled by such a switch. At the same time these unique mechanisms provide for automatic actuation of auxiliary switching means to compensate for any changes that might be necessary in the electrical system controlled by this multiple double throw switch due to the cut-out of one circuit.

I claim:

1. An electrical switch including a stationary contact, a movable contact carrier, contact means pivotally fastened to said carrier, means to shift said carrier and move said contact means into and out of engagement with said stationary contact, and cam means including co-operable cam surfaces associated with said contact means and said carrier and operable to pivot said contact means on said carrier out of engagement with said stationary contact when said carrier is in a position to cause said contact means to engage said stationary contact.

2. An electrical switch including a stationary contact, a rotatable contact carrier, a movable contact pivotally attached to said carrier, means to rotate said carrier and move said movable contact into and out of engagement with said stationary contact, and means to pivotally move said movable contact relative to said carrier out of engagement with said stationary contact when said carrier is in a position to cause said movable contact to engage said stationary contact including a surface on said movable contact removed from the location where said movable contact is pivotally attached to said carrier and a cam movably attached to said carrier and having a cam surface engageable with said first mentioned surface.

3. An electrical switch comprising a stationary contact, a rotatable contact carrier, a movable contact pivotally attached to said carrier, means to rotate said carrier and move said movable contact into and out of engagement with said stationary contact, and means to move said movable contact out of engagement with said stationary contact when said carrier is in a position to cause the movable contact to engage said stationary contact including a pin attached to said movable contact at a point removed from the pivot point between said carrier and said movable contact and a manually rotatable cam attached to said contact carrier having cam surfaces engageable with said pin which upon being manually actuated cause said pin and said movable contact to move away from said stationary contact.

4. An electrical switch comprising a stationary contact, a rotatable contact carrier, a movable contact pivotally attached to said carrier, means to rotate said carrier and move said movable contact into and out of engagement with said stationary contact, and means to hold said movable contact out of engagement with said stationary contact when said carrier is in a position that would normally cause said movable contact to engage said stationary contact including a pin attached to said movable contact member and located remote from the point of pivotal attachment between said movable contact and said carrier, and a rotatable cam attached to said carrier and having cam surfaces engageable with said pin for holding said movable contact removed from said stationary contact.

5. An electrical switch including a pair of oppositely disposed stationary contacts, a rotary contact carrier, a pair of movable contacts movably attached to said carrier and interposed between said stationary contacts, means to limitedly rotate said carrier back and forth to cause each of said movable contacts to alternately engage and disengage with one of said stationary contacts, and manually actuated cam means to retract said movable contacts to prevent engagement of said movable contacts with said stationary contacts when said carrier is so limitedly rotated including cam surfaces associated with each of said contact means and a rotatable cam attached to said carrier intermediate said surfaces, said cam having surfaces cooperable with said first mentioned surfaces which upon rotation of said cam move said first mentioned surfaces relative to said carrier.

6. An electrical switch comprising a pair of oppositely disposed stationary contacts, a rotary contact carrier, a pair of movable contacts movably supported on said carrier and interposed between said stationary contacts, means to limitedly rotate said carrier back and forth to cause each of said movable contacts to alternately engage and disengage with one of said stationary contacts, and means to retract said movable contacts to prevent engagement of said movable contacts with said stationary contacts when said carrier is so limitedly rotated including a rotatable cam attached to said carrier and having cam surfaces which when said rotatable cam is actuated are adapted to engage means on said movable contacts and cam said movable contacts toward each other and away from said stationary contacts.

7. An electrical switch including a pair of oppositely disposed stationary contacts, a rotary contact carrier, a pair of movable contacts movably attached to said carrier and interposed between said stationary contacts, means to limitedly rotate said carrier back and forth to cause each of said movable contacts to alternately engage and disengage with one of said stationary contacts, manually operated cam means to retract said movable contacts to prevent engagement of said movable contacts with said stationary contacts when said carrier is so limitedly rotated, and secondary switching means mounted on said carrier and actuated by said manually operated cam means.

8. An electrical switch including a stationary contact, a movable contact carrier, a movable contact attached to said carrier, means to operate said carrier to move said movable contact into and out of engagement with said stationary contact, secondary switching means mounted on said carrier, and cam means associated with said carrier, said movable contact and said secondary switching means, said cam means being operable to simultaneously move said movable contact out of engagement with said stationary contact when said carrier is in a position to cause said movable contact to engage said stationary contact and actuate said secondary switching means.

References Cited in the file of this patent

UNITED STATES PATENTS

| 1,276,110 | Rasmussen | Aug. 20, 1918 |
| 1,702,035 | Berthold | Feb. 12, 1929 |
| 2,059,023 | Perry | Oct. 27, 1936 |
| 2,163,919 | Siegel | June 27, 1939 |
| 2,594,181 | Kliegl et al. | Apr. 22, 1952 |

FOREIGN PATENTS

| 200,132 | Great Britain | July 2, 1923 |